Aug. 26, 1924.  1,506,091

J. L. SHULTZ

BRAKE OPERATING MECHANISM

Filed June 30, 1923

John L. Shultz,
Inventor

Patented Aug. 26, 1924.

1,506,091

UNITED STATES PATENT OFFICE.

JOHN L. SHULTZ, OF BELLEFONTE, PENNSYLVANIA.

BRAKE-OPERATING MECHANISM.

Application filed June 30, 1923. Serial No. 648,674.

*To all whom it may concern:*

Be it known that I, JOHN L. SHULTZ, a citizen of the United States, residing at Bellefonte, in the county of Center and State of Pennsylvania, have invented certain new and useful Improvements in Brake-Operating Mechanism, of which the following is a specification.

This invention relates to brake operating mechanisms, and has particular reference to the provision of a connecting rod for mechanisms of the above kind so constructed as to constitute an elastic tension device capable of taking up wear in the brake linings and other parts.

The primary object of the invention is to provide a device of the above kind embodying the desired qualities of simplicity and durability of construction as well as presenting a device which is efficient in operation.

With the above general object in view, and others that will become apparent as the nature of the invention is better understood, the same consists in the novel form, combination and arrangement of parts hereinafter more fully described, shown in the accompanying drawings and claimed.

Figure 1:
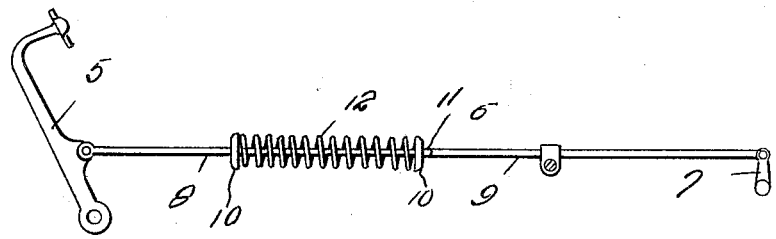
Figure 2:
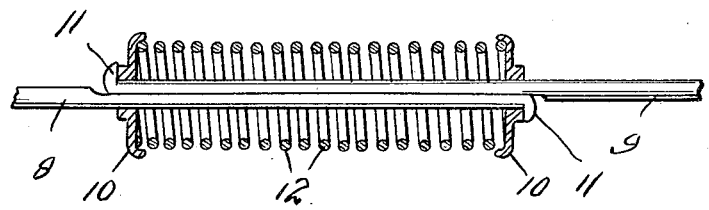
Figure 3:
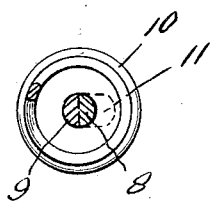

In the drawing, wherein like reference characters indicate corresponding parts throughout the several views, Figure 1 is a side elevational view illustrating a brake rod constructed in accordance with the present invention and attached to cooperating parts of the brake mechanism, Figure 2 is an enlarged longitudinal sectional view of the brake rod shown in Figure 1, partly broken away, and Figure 3 is a transverse sectional view through the spring of the device shown in Figure 2.

Referring more in detail to the several views, 5 indicates the usual brake operating pedal connected by a rod 6 to the usual lever 7 which is adapted to be operatively connected to the brake band, not shown, in the usual and well known manner.

In order to take up for wear, in prior constructions, it has been usual to construct the rod 6 in two sections connected by a turnbuckle, thus requiring a manual adjustment of the rod 6 whenever required. In order to provide a rod which will automatically take up for this wear, I have constructed the same of a pair of sections 8 and 9, the ends of which are overlapped as shown clearly in Figure 2, and which overlapped ends are preferably provided with slidably engaged adjacent flat surfaces as shown in Figure 3.

An abutment is held upon the end of each of the sections 8 and 9 and these abutments preferably consist of discs 10 which loosely surround the overlapped ends of the sections and which are held against separating displacement by any suitable means such as the outturned free end portions 11 provided upon the rod sections 8 and 9. The discs 10 are formed with central openings receiving the overlapped ends of the rod sections 8 and 9 and cooperate to form spaced bearings for said rod sections intermediate the ends of the rod member formed thereby so as to prevent the sections from working out of alignment and destroying the result which this invention is designed to effect. A helical compression spring 12 is provided about the overlapped ends of the rod sections between the discs 10, and this spring is normally under compression so that upon the occurrence of wear in the brake band linings or other parts of the brake mechanism, the same will be automatically taken up due to expansion of this spring which causes sliding movement of the overlapped ends of the brake rod further onto each other.

By means of the above construction the proper operation of the brake band is insured and the necessity of constant manual adjustment is rendered unnecessary.

Minor changes may be made without departing from the spirit and scope of the invention as claimed.

What I claim as new is:

In a brake operating mechanism, a connecting rod composed of sections which are circular in transverse section, said sections being diametrically flattened at their ends, said diametrically flattened end portions overlapping each other and being provided with angularly disposed extremities, discs having circular central openings receiving the diametrically flattened overlapping end portions of the rod sections and located between the angularly disposed extremities thereof and a coil spring bearing against the inner faces of the discs and having its convolutions surrounding the diametrically flattened overlapping end portions of the rod sections.

In testimony whereof I affix my signature.

JOHN L. SHULTZ.